(12) United States Patent
Honda et al.

(10) Patent No.: US 7,197,700 B2
(45) Date of Patent: Mar. 27, 2007

(54) METHOD AND SYSTEM FOR JOB MANAGEMENT

(75) Inventors: Masanori Honda, Sagamihara (JP);
Toshiaki Hirata, Kashiwa (JP);
Shigeru Miyake, Tokyo (JP); Yusuke Izumida, Chigasaki (JP); Takaki Kuroda, Machida (JP); Atsushi Murase, Sagamihara (JP); Taro Inoue, Yamato (JP); Kenichi Kihara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 138 days.

(21) Appl. No.: 10/649,307

(22) Filed: Aug. 26, 2003

(65) Prior Publication Data
US 2004/0172634 A1    Sep. 2, 2004

(30) Foreign Application Priority Data
Feb. 28, 2003    (JP) .............................. 2003-054277

(51) Int. Cl.
*G06F 17/00*    (2006.01)

(52) U.S. Cl. ................... 715/513; 715/500.1; 715/505; 718/100; 718/102; 718/103

(58) Field of Classification Search ................ 718/100, 718/102, 103; 715/500.1, 505, 513
See application file for complete search history.

(56) References Cited

U.S. PATENT DOCUMENTS

| 5,619,655 | A | | 4/1997 | Weng et al. |
| 5,907,848 | A | * | 5/1999 | Zaiken et al. ................ 707/202 |
| 6,044,394 | A | * | 3/2000 | Cadden et al. .............. 718/107 |
| 6,104,393 | A | * | 8/2000 | Santos-Gomez ............ 715/763 |
| 6,141,665 | A | | 10/2000 | Hara et al. |
| 6,173,295 | B1 | * | 1/2001 | Goertz et al. ................ 715/505 |
| 6,408,323 | B1 | * | 6/2002 | Kobayashi et al. .......... 718/100 |
| 6,438,553 | B1 | | 8/2002 | Yamada |
| 6,587,861 | B2 | | 7/2003 | Wakai et al. |
| 6,597,469 | B1 | | 7/2003 | Kuroyanagi |
| 6,650,433 | B1 | * | 11/2003 | Keane et al. .............. 358/1.15 |
| 6,665,716 | B1 | | 12/2003 | Hirata et al. |
| 6,678,716 | B1 | * | 1/2004 | Pronsati et al. ............. 709/201 |
| 6,795,854 | B1 | * | 9/2004 | Parker et al. ................ 709/223 |
| 2001/0029516 | A1 | * | 10/2001 | Mizuno ....................... 709/100 |
| 2001/0039594 | A1 | * | 11/2001 | Park et al. ................... 709/311 |

(Continued)

FOREIGN PATENT DOCUMENTS

JP    10-074220 A    3/1998

OTHER PUBLICATIONS

Paul McFedries, The Complete Idiot's Guide to Windows 95 Second Edition, 1997, Que Corporation, p. 356.*

*Primary Examiner*—Tadesse Hailu
*Assistant Examiner*—Alvin H Tan
(74) *Attorney, Agent, or Firm*—Townsend and Townsend and Crew LLP

(57) ABSTRACT

The disclosed is a method and system for storing a stencil for a job definition statement and data prescribing a user interface for job definition statement setup, generating data for executing a process for generating a job definition statement based on the contents set by a user via the user interface in accordance with the stencil for the job definition statement and the data prescribing the user interface for job definition statement setup, and generating a job definition statement by executing the process in accordance with the generated data.

19 Claims, 15 Drawing Sheets

| ELEMENT NAME | | OVERVIEW |
|---|---|---|
| POLICY TEMPLATE SET | | ·A ROOT ELEMENT FOR ALL THE FOLLOWING ELEMENTS |
| POLICY TEMPLATE GROUP | | ·AN ELEMENT FOR GROUPING POLICY TEMPLATES<br>·THE POLICY TEMPLATE GROUP CAN BE WRITTEN IN A NESTED FORM AND PLAYS A ROLE SIMILAR TO THAT OF THE FILE SYSTEM'S FOLDER (DIRECTORY) |
| POLICY TEMPLATE | | ·AN ELEMENT FOR FORMING VARIOUS DEFINITIONS FOR GENERATING ONE POLICY RULE<br>·HAS CHILD ELEMENTS INCLUDING POLICY STENCIL, WIZARD PAGE, POLICY TEMPLATE VARIABLE, AND RESOURCE TYPE |
| POLICY STENCIL | | ·AN ELEMENT FOR DEFINING A MODEL FOR A POLICY RULE<br>·CONTAINS A REFERENCE TO A POLICY TEMPLATE VARIABLE AND A POLICY STENCIL CONTROL STATEMENT WITHIN A POLICY RULE DEFINED BY A POLICY DEFINITION XML FILE |
| WIZARD PAGE | | ·AN ELEMENT FOR DEFINING A WIZARD WINDOW (PARAMETER SETUP PAGE)<br>·EACH WIZARD PAGE SERVES AS A WIZARD WINDOW PAGE<br>·ONE OR MORE PARAMETER SETUP CONTROLS CAN BE DEFINED FOR EACH WIZARD PAGE |
| PARAMETER SETUP CONTROL | | ·AN ELEMENT FOR FINALIZING A POLICY TEMPLATE VARIABLE (VALUE SUBSTITUTION)<br>·EACH PARAMETER SETUP CONTROL FINALIZES ONE POLICY TEMPLATE VARIABLE |
| | TEXT LINE | ·A CONTROL FOR SPECIFYING ONE CHARACTER STRING LINE |
| | TEXT AREA | ·A CONTROL FOR SPECIFYING A PLURALITY OF CHARACTER STRING LINES |
| | SELECT ITEM | ·A CONTROL FOR DISPLAYING A PLURALITY OF ITEMS AND SELECTING A SPACIFIC ITEM FROM THEM |
| POLICY TEMPLATE VARIABLE | | ·A VARIABLE DECLARED FOR A POLICY TEMPLATE. THE METHOD FOR FINALIZING ITS VALUE IS DEFINED BY A PARAMETER SETUP CONTROL WITHIN A WIZARD PAGE, AND THE VALUE IS REFERENCED WITHIN A POLICY STENCIL OR WIZARD PAGE |
| RESOURCE TYPE | | ·AN ELEMENT FOR DEFINING WHICH RESOURCE CAN BE ASSOCIATED WITH A POLICY TEMPLATE |

U.S. PATENT DOCUMENTS

| | | |
|---|---|---|
| 2002/0007365 A1 | 1/2002 | Aoyama et al. |
| 2002/0078116 A1 | 6/2002 | Aoki |
| 2002/0120459 A1* | 8/2002 | Dick et al. .................. 705/1 |
| 2003/0061334 A1 | 3/2003 | Hirata et al. |
| 2003/0107758 A1* | 6/2003 | Fujiwara ................. 385/1.15 |
| 2003/0120701 A1 | 6/2003 | Pulsipher et al. |
| 2003/0193689 A1 | 10/2003 | Nakagawa |
| 2003/0195917 A1 | 10/2003 | Horiyama et al. |
| 2004/0021903 A1 | 2/2004 | Wanda |
| 2004/0046982 A1 | 3/2004 | Jeyachandran et al. |
| 2004/0049531 A1 | 3/2004 | Honda et al. |
| 2004/0068507 A1 | 4/2004 | Inoue |

* cited by examiner

F I G. 3

| ELEMENT NAME | OVERVIEW |
|---|---|
| POLICY | • POLICY DEFINITION XML FILE'S ROOT ELEMENT |
| POLICY GROUP | • AN ELEMENT FOR GROUPING POLICY RULES AND POLICY GROUPS<br>• THE POLICY GROUP IS USED FOR MARSHALING POLICY RULES WITHIN A THREE STRUCTURE<br>• DEFINES A CALENDER (HOLIDAYS) |
| POLICY RULE | • AN ELEMENT FOR GROUPING POLICY CONDITIONS, POLICY ACTIONS, AND POLICY RULES<br>• A POLICY RULE DEFINED AS A CHILD ELEMENT FOR A POLICY OR POLICY GROUP (THAT IS, A POLICY RULE WITHOUT A HIGHER-LEVEL POLICY RULE) IS CALLED A ROOT POLICY RULE (OR SIMPLY CALLED A POLICY RULE)<br>• A POLICY RULE DEFINED AS A CHILD ELEMENT FOR ANOTHER POLICY RULE IS CALLED A SUB-POLICY RULE<br>• WHEN A POLICY CONDITION DEFINED AS A CHILD ELEMENT FOR A POLICY RULE IS ESTABLISHED, A POLICY ACTION DEFINED AS A SIBLING ELEMENT AND A SUB-POLICY RULE WILL BE EXECUTED |
| POLICY WAIT EVENT CONDITION | • WAITS FOR AN EVENT<br>• USED FOR WRITING AN EVENT-DRIVEN POLICY |
| POLICY SCHEDULE CONDITION | • WAITS FOR A SPECIFIED TIME<br>• USED FOR EXECUTING A POLICY ACTION AT A PRESELECTED TIME |
| POLICY COMMAND RESULT CONDITION | • WAITS FOR A SPECIFIED POLICY COMMAND ACTION TO TERMINATE<br>• EXECUTES A POLICY ACTION DEFINED AS A SIBLING ELEMENT WHEN THE RESULT OF POLICY COMMAND ACTION EXECUTION COINCIDES WITH A SPECIFIED VALUE |
| POLICY RULE VALIDITY PERIOD | • DEFINES THE VALIDITY PERIOD OF A ROOT POLICY RULE |
| COMPOUND POLICY ACTION | • AN ELEMENT FOR GROUPING POLICY ACTIONS |
| POLICY COMMAND ACTION | • DEFINES A COMMAND THAT IS TO BE EXECUTED WHEN A POLICY CONDITION DEFINED AS A SIBLING ELEMENT IS ESTABLISHED |

FIG. 4A

```
<!ELEMENT PolicyRule
    (
        (
            Policy Wait Eevent Condition* |
            Policy Schedule Condition? |
            Policy Command Result Condition?
        )
        (
            Compound Policy Action |
            Policy Command Action |
            Policy Rule
        )+.
        Global Environment*
    )
>
<!ATTLIST Policy Rule
    Policy Rule Name
        CDATA
        #IMPLIED
    Condition List Type
        (CNF | DNF)
        "CNF"
    Rule Usage
        CDATA
        #IMPLIED
    Host Name
        CDATA
        #IMPLIED
    Global Environment File Name
        CDATA
        #IMPLIED
    Time Period
        CDATA
        #IMPLIED
    Time Zone ID
        CDATA
        #IMPLIED
>

<!--***************************************************-->
<!-Policy Wait Event Condition element->
<!--***************************************************-->
<ELEMENT Policy Wait Event Condition
    EMPTY
>
<!ATTLIST Policy Wait Event Condition
    Policy Condition Name
        CDATA
        #IMPLIED
    Event ID
        CDATA
#REQUIRED
    Event Message
        CDATA
        #IMPLIED
    Event Message Pass Name
        CDATA
        #IMPLIED
    Watching Host Name
```

FIG. 4B

```
<!--***************************************************-->
<!--Policy element -->
<!--***************************************************-->
<!ELEMENT Policy
    (
        Policy Group |
        Policy Rule
    )+
>
<!ATTLIST Policy
    Version
        CDATA
        #REQUIRED
>

<!--***************************************************-->
<!--Policy Group element-->
<!--***************************************************-->
<!ELEMENT Policy Group
    (
        (
            Policy Group |
            Policy Rule
        )*.
        Holiday Or Excluce Data*
        Global Environment*
    )
>
<!ATTLIST Policy Group
    Policy Group Name
        CDATA
        #REQUIRED
    Holiday Day Of Week
        CDATA
        "0x00"
    Day Start Time
        CDATA
        "0C00"
    Global Environment File Name
        CDATA
        #IMPLIED
    Time Period
        CDATA
        #IMPLIED
    Time Zone ID
        CDATA
        "Local"
>

<!--***************************************************-->
<!--Policy element-->
<!--***************************************************-->
```

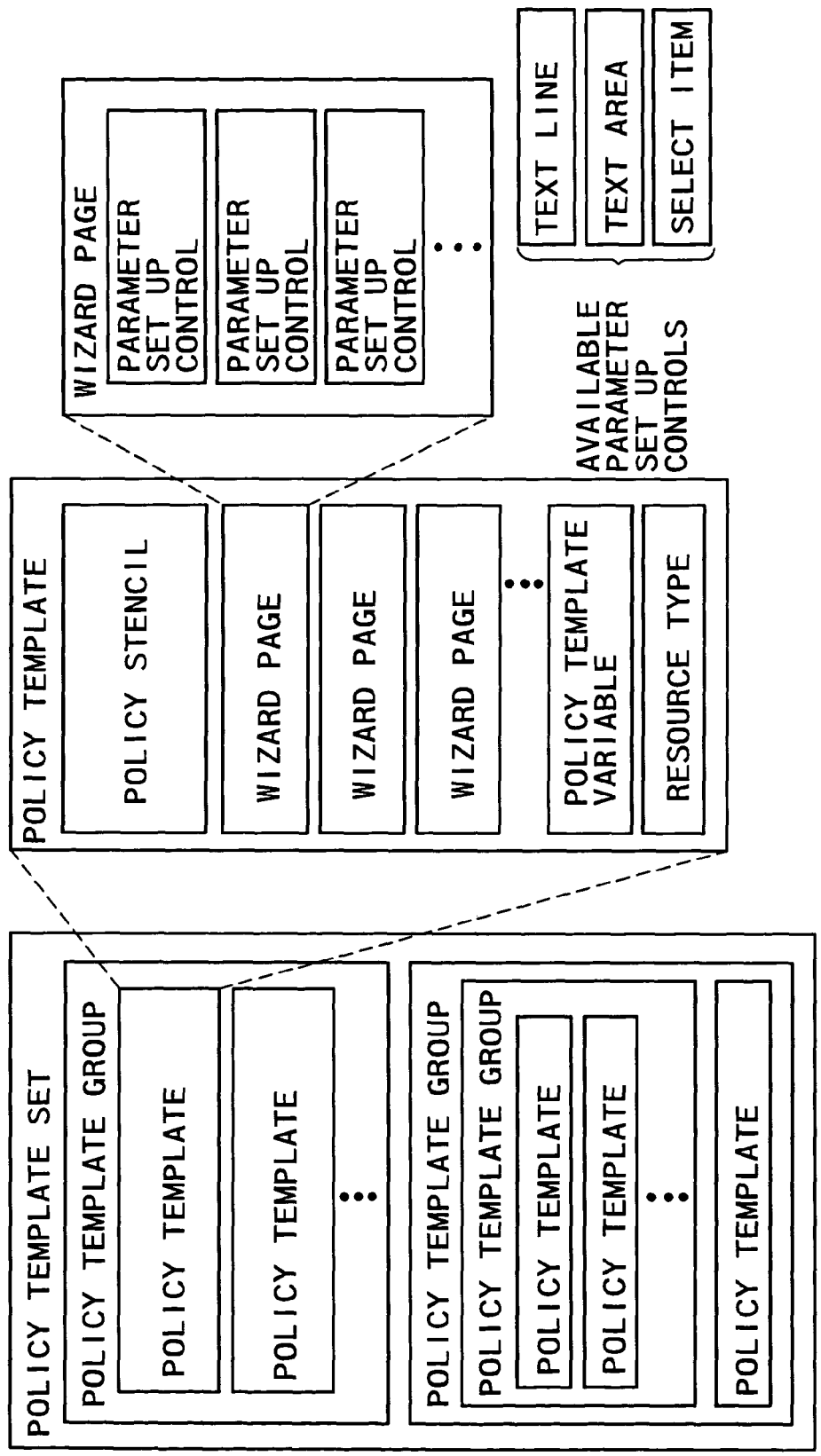

FIG. 6

| ELEMENT NAME | | OVERVIEW |
|---|---|---|
| POLICY TEMPLATE SET | | • A ROOT ELEMENT FOR ALL THE FOLLOWING ELEMENTS |
| POLICY TEMPLATE GROUP | | • AN ELEMENT FOR GROUPING POLICY TEMPLATES<br>• THE POLICY TEMPLATE GROUP CAN BE WRITTEN IN A NESTED FORM AND PLAYS A ROLE SIMILAR TO THAT OF THE FILE SYSTEM'S FOLDER (DIRECTORY) |
| POLICY TEMPLATE | | • AN ELEMENT FOR FORMING VARIOUS DEFINITIONS FOR GENERATING ONE POLICY RULE<br>• HAS CHILD ELEMENTS INCLUDING POLICY STENCIL, WIZARD PAGE, POLICY TEMPLATE VARIABLE, AND RESOURCE TYPE |
| POLICY STENCIL | | • AN ELEMENT FOR DEFINING A MODEL FOR A POLICY RULE<br>• CONTAINS A REFERENCE TO A POLICY TEMPLATE VARIABLE AND A POLICY STENCIL CONTROL STATEMENT WITHIN A POLICY RULE DEFINED BY A POLICY DEFINITION XML FILE |
| WIZARD PAGE | | • AN ELEMENT FOR DEFINING A WIZARD WINDOW (PARAMETER SETUP PAGE)<br>• EACH WIZARD PAGE SERVES AS A WIZARD WINDOW PAGE<br>• ONE OR MORE PARAMETER SETUP CONTROLS CAN BE DEFINED FOR EACH WIZARD PAGE |
| PARAMETER SETUP CONTROL | | • AN ELEMENT FOR FINALIZING A POLICY TEMPLATE VARIABLE (VALUE SUBSTITUTION)<br>• EACH PARAMETER SETUP CONTROL FINALIZES ONE POLICY TEMPLATE VARIABLE |
| | TEXT LINE | • A CONTROL FOR SPECIFYING ONE CHARACTER STRING LINE |
| | TEXT AREA | • A CONTROL FOR SPECIFYING A PLURALITY OF CHARACTER STRING LINES |
| | SELECT ITEM | • A CONTROL FOR DISPLAYING A PLURALITY OF ITEMS AND SELECTING A SPACIFIC ITEM FROM THEM |
| POLICY TEMPLATE VARIABLE | | • A VARIABLE DECLARED FOR A POLICY TEMPLATE. THE METHOD FOR FINALIZING ITS VALUE IS DEFINED BY A PARAMETER SETUP CONTROL WITHIN A WIZARD PAGE, AND THE VALUE IS REFERENCED WITHIN A POLICY STENCIL OR WIZARD PAGE |
| RESOURCE TYPE | | • AN ELEMENT FOR DEFINING WHICH RESOURCE CAN BE ASSOCIATED WITH A POLICY TEMPLATE |

FIG. 7

```
<@ ValidIf (EXPRESSION) { @> //START STATEMENT
     Policy Rule description
     ...
     <@ { @>                  //END STATEMENT
```

· THE EXPRESSION IS IN THE FOLLOWING FORMS. AN ATTEMPT
  IS MADE TO CONVERT VALUE 1 AND VALUE 2 INTO A NUMERICAL
  VALUE (Integer). IF THE ATTEMPT FAILS, VALUE 1 AND VALUE
  2 WILL BE HANDLED AS A CHARACTER STRING.

VALUE 1 == VALUE 2    THE EXPRESSION IS TRUE IF VALUE 1 IS EQUAL TO VALUE 2.
VALUE 1 != VALUE 2    THE EXPRESSION IS TRUE IF VALUE 1 IS NOT EQUAL TO VALUE 2.
VALUE 1 <= VALUE 2    THE EXPRESSION IS TRUE IF VALUE 1 IS SMALLER THAN OR EQUAL TO VALUE 2.
VALUE 1 >= VALUE 2    THE EXPRESSION IS TRUE IF VALUE 1 IS GREATER THAN OR EQUAL TO VALUE 2.
VALUE 1 <  VALUE 2    THE EXPRESSION IS TRUE IF VALUE 1 IS SMALLER THAN VALUE 2.
VALUE 1 >  VALUE 2    THE EXPRESSION IS TRUE IF VALUE 1 IS GREATER THAN VALUE 2.

· A PLURALITY OF EXPRESSIONS CAN BE COMBINED BY ORING
  (||) OR ANDING (&&). PARENTHESES "( )" CAN ALSO BE
  DESIGNATED TO SPECIFY THE ORDER OF PRIORITY.

FIG. 8

```
<@ ForEach VARIABLE NAME (LIST) { @>   //START STATEMENT

Policy Rule description

...

<@ } @>                                 //END STATEMENT
```

- WITHIN A POLICY RULE DESCRIPTION BETWEEN THE START STATEMENT AND END STATEMENT, THE "VARIABLE REFERENCE "AND"SERIAL NUMBER REFERENCE" DESCRIPTIONS CAN BE WRITTEN AS INDICATED BELOW. WHEN A POLICY RULE IS GENERATED, THESE REFERENCE DESDRIPTIONS ARE REPLACED BY ACTUAL VALUES.

`<@=VARIABLE NAME @>`
- REPLACED BY A LIST ELEMENT VALUE.

`<@=number (START NUMBER,NUMBER OF DIGITS) @>`
- REPLACED BY A NUMERICAL VALUE ACCORDING TO A SEQUENCE OF LIST ELEMENTS.
- THE START NUMBER AND THE NUMBER OF DIGITS CAN BE SPECIFIED. IF,FOR INSTANCE, THE START NUMBER IS SET TO 5 WITH THE NUMBER OF DIGITS SET TO 3,THE DESCRIPTIONS ARE SEQUENTIALLY REPLACED BY THE CHARACTER STRINGS "005", "006", "007",AND SO ON.

FIG. 9A

```
      Skip Rule Value
            CDATA
            "0"
>
<!--***************************************************-->
<!--Text Line element-->
<!--***************************************************-->
<!ELEMENT Text Line
      (
            Command |
            Text File |
            Java Class
      )?
>
<ATTLIST Text Line
      %ELEMENT Common;
      %Affix;
      %Parm Control Common;
      Text Type
            (Normal Text | Password)
            "Normal Text"
      Size
            CDATA
            #IMPLIED
      Max Length
            CDATA
            #IMPLIED
      Default Value
            CDATA
            #IMPLIED
      %Param Control Style:
      %Param Control Input Constrationt;
>

<!--***************************************************-->
<!--Text Area element-->
<!--***************************************************-->
<!ELEMENT Text Area
      (
            Command |
            Text File |
            Java Class
      )?
>
<!ATTLIST Text Area
      Element Common;
      %Affix;
      %Param Control Common;
      Rows
            CDATA
            #IMPLIED
      Columns
            CDATA
            #IMPLIED
      Default Value
            CDATA
            #IMPLIED
      %Param Control STYLE;
```

FIG. 9B

```
        Default Policy Rule Name
             CDATA
             #IMPLIED
        Working Policy Group Name
             CDATA
             #IMPLIED
>

<!--*****************************************************-->
<!--Policy template Variable element-->
<!--*****************************************************-->
<!ELEMENT Policy template Variable
    EMPTY
>
<!ATTLIST Policy Template Variable
    Name
        CDATA
        #REQUIRED
    Is Array
        (True | False)
        "False"
>

<!--*****************************************************-->
<!--Resource Type element-->
<!--*****************************************************-->
<!--ELEMENT Resource Type
    EMPTY
>
<!ATTLIST Resource Type
    Name
        CDATA
        #REQUIRED
>

<!--*****************************************************-->
<!--Wizard Page element-->
<!--*****************************************************-->
<!ELEMENT Wizard Page
    (
        Text Line |
        Text Area |
        Select Item
    )+
>
<!ATTLIST Wizard Page
    %Element Common;
    Wizard Page Name
        CDATA
        #IMPLIED
    Policy Template Variable For Skip Rule
        CDATA
        #IMPLIED
    Skip Rule
        (GT | GE | LT | LE | EQ | NE)
        "ED"
    Compare As
        (String Integer)
        "Integer"
```

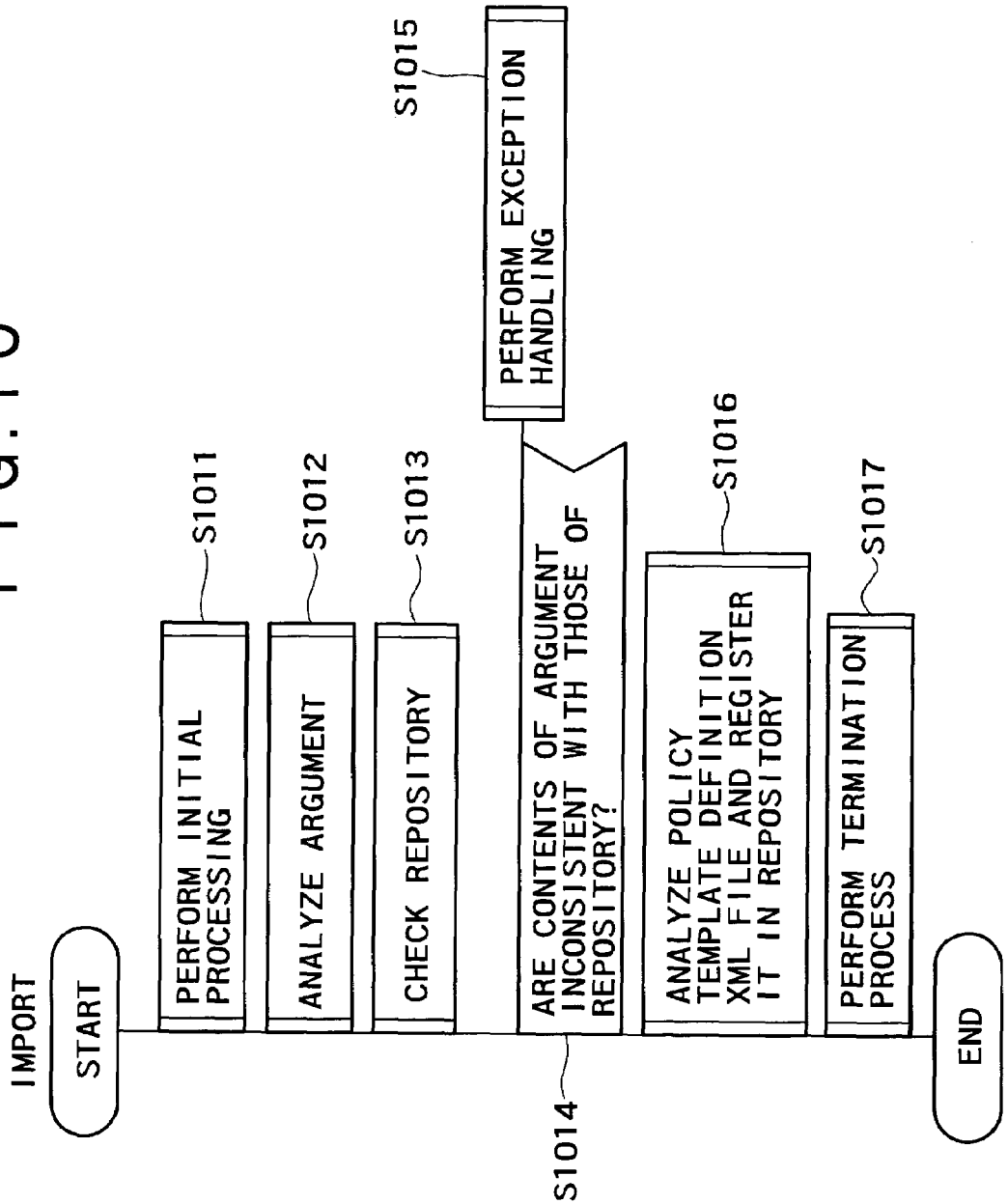

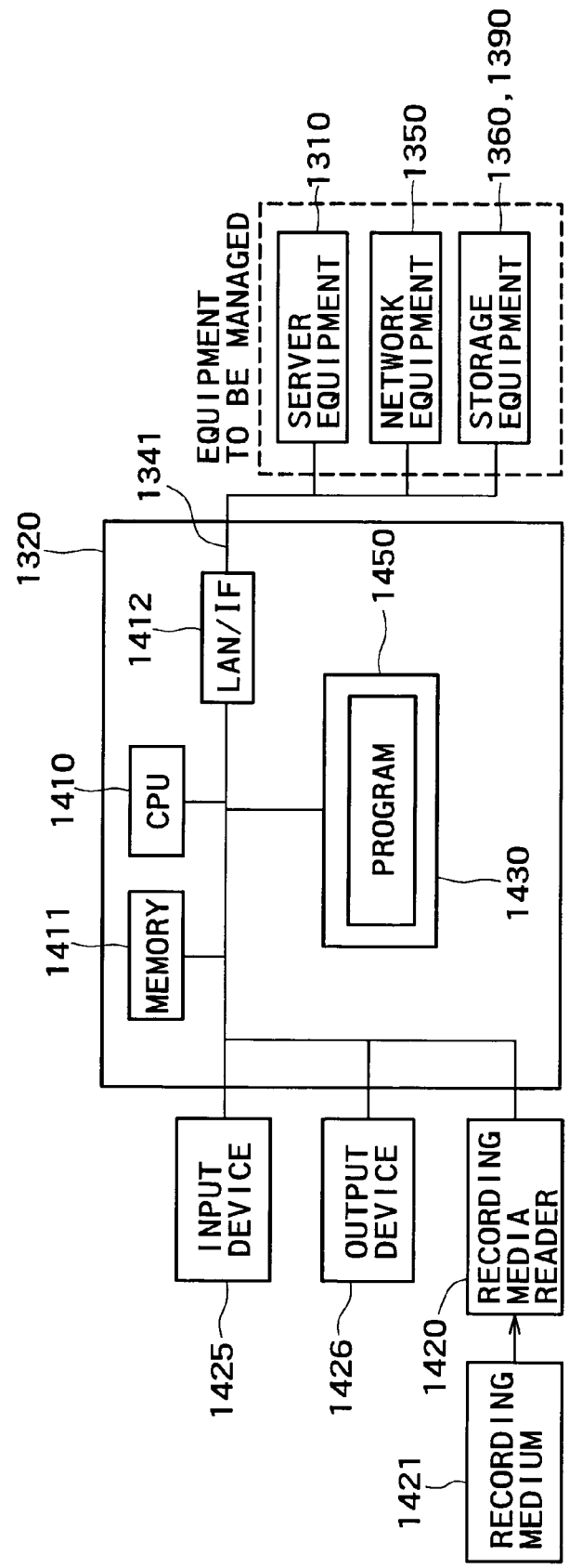

METHOD AND SYSTEM FOR JOB MANAGEMENT

BACKGROUND OF THE INVENTION

1. Field of the Invention

The present invention relates to a method and system for job management within an information processing system, a program for executing job management, and a recording medium for storing such a program.

2. Description of the Related Art

In an information processing system that comprises a computer serving as an information processing device, the jobs to be executed by the computer are generally set by writing a job control language with an editor or using a job setup tool. Some other systems use a GUI (Graphical User Interface) to perform job setup.

At the present time when the information technology is advanced, a professional, complicated technology is demanded for use in job setup. For job setup for an information processing system having a large-scale, complicated configuration, it is particularly demanded that job setup be performed efficiently while considering how the CPU, memory, disk, backup device, and other resources are used. Meanwhile, for the definition of a job network that executes a stream of coordinated jobs, an advanced technology is required for executing the jobs while smoothly coordinating the jobs. Since increased workload is imposed on users, operators, and other job setup persons, a scheme for efficiently managing the jobs to be executed by a computer system is now called for.

SUMMARY OF THE INVENTION

It is an object of the present invention to provide a job management method, an information processing system, a program, and a recording medium.

Preferably, the present invention provides a job management method for an information processing system, which includes an information processing device. The job management method of the present invention comprises the steps of storing a stencil for a job definition statement and data prescribing a user interface for job definition statement setup; generating data for executing the process for generating a job definition statement based on the contents set by a user via the user interface in accordance with the stencil for the job definition statement and the data prescribing the user interface for job definition statement setup; and generating the job definition statement by executing the process in accordance with the generated data.

The job definition statement is written, for instance, in a policy definition XML file, which is described later. The stencil for a job definition statement is written, for instance, in a policy template definition XML file, which is described later. The stencil for a job definition statement is written, for instance, in a policy template definition XML file, which is described later. The data for prescribing the user interface for job definition statement setup is, for instance, a wizard page, which is an element for policy template definition as described later. A stencil for a wizard page is written in a policy template definition XML file, which is described later. The user interface is, for instance, a setup guidance window (wizard window) that is generated by a policy wizard GUI, which is described later, in compliance with the contents of the wizard page for policy template definition.

In addition to a job definition statement stencil, the present invention provides a data which prescribes the user interface for job definition statement setup. With such a data, it is possible to efficiently generate a user interface (e.g., setup guidance window (wizard window)) for letting a user, operator, or other similar person generate a job definition statement. The present invention also makes it possible to offer a flexible user interface in accordance with the information processing system configuration, elements, user needs, applicable operations, and the like, thereby reducing the workload on users, operators, and other job definition setup persons.

The other features and advantages of the present invention will be apparent from the following detailed description and from the accompanying drawings.

BRIEF DESCRIPTION OF THE DRAWINGS

FIG. 3 shows elements that are unique to an information processing system according to one embodiment of the present invention.

FIGS. 4A and 4B show a DTD sample of a policy definition XML file according to one embodiment of the present invention.

FIG. 5 illustrates the structure of a policy template according to one embodiment of the present invention.

FIG. 6 shows major elements of a policy template according to one embodiment of the present invention.

FIG. 7 shows an example of a statement written in a policy stencil according to one embodiment of the present invention.

FIG. 8 shows an example of a statement written in a policy stencil according to one embodiment of the present invention.

FIGS. 9A and 9B show a DTD sample of a policy template definition XML file according to one embodiment of the present invention.

FIG. 10 is a PAD illustrating a process that a policy template parser according to one embodiment of the present invention performs in relation to an import function.

FIG. 14 is a block diagram illustrating the configuration of a management server according to one embodiment of the present invention.

DETAILED DESCRIPTION OF THE PREFERRED EMBODIMENTS

Figure 1:
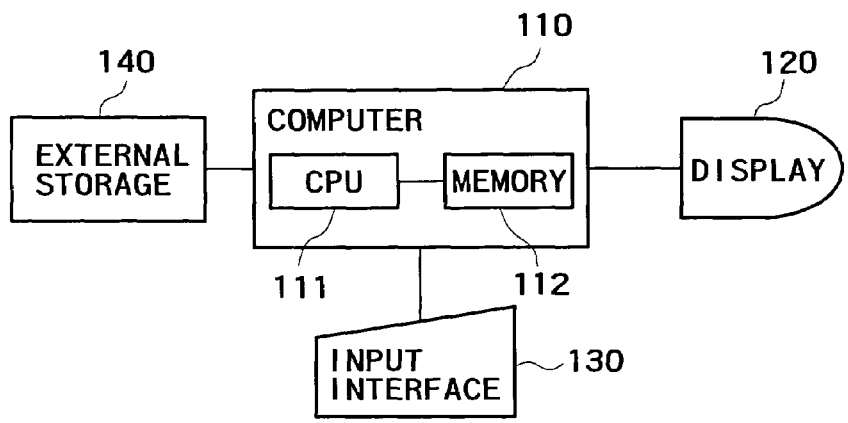
FIG. 1 illustrates the hardware configuration of an information processing system according to one embodiment of the present invention.

FIG. 1 illustrates the hardware configuration of an information processing system, which will be described as one embodiment of the present invention. The information processing system includes a computer 110, which comprises a CPU 111 and a memory 112, which includes a ROM and a RAM; a display or other display device 120; an input interface 130, which includes a keyboard and a mouse; and a hard disk drive, CD-ROM, or DVD-ROM, or other external storage device 140. The computer 110 may be a mainframe computer, workstation, personal computer, or the like. A UNIX (registered trademark) or other operating system runs on the computer 110. Various application programs run on the operating system. On the operating system, a Web server also runs to offer a Web page on which a setup guidance window described later is written. The data stored in the external storage device 140 is managed on an individual file basis by the functionality of a file system that belongs to the operating system.

In the present embodiment, a job is a unit of processing to be performed by the computer 110 as viewed from a user of the computer 110. In the information processing system of the present embodiment, a job management system operates and provides an automatic job execution scheme. The job management system is implemented by a program that is executed by the computer 110. When used with a bank's on-line system, the job management system serves, for instance, as a batch processing system for performing transaction data totalization, analysis, data backup, and other operations. The job management system receives job setup instructions and conditions entered by a user, operator, or other similar person via the input interface 130, and executes a specified job under specified conditions. The conditions include conditions concerning a schedule for specifying the job execution date/time. In regards to job network setup for executing a stream of a plurality of jobs, the conditions include those which are based on inter-job restrictions such as the succeeding job execution conditions appropriate for the status of a preceding job process execution (e.g., processing in progress or processing completed).

Figure 2:
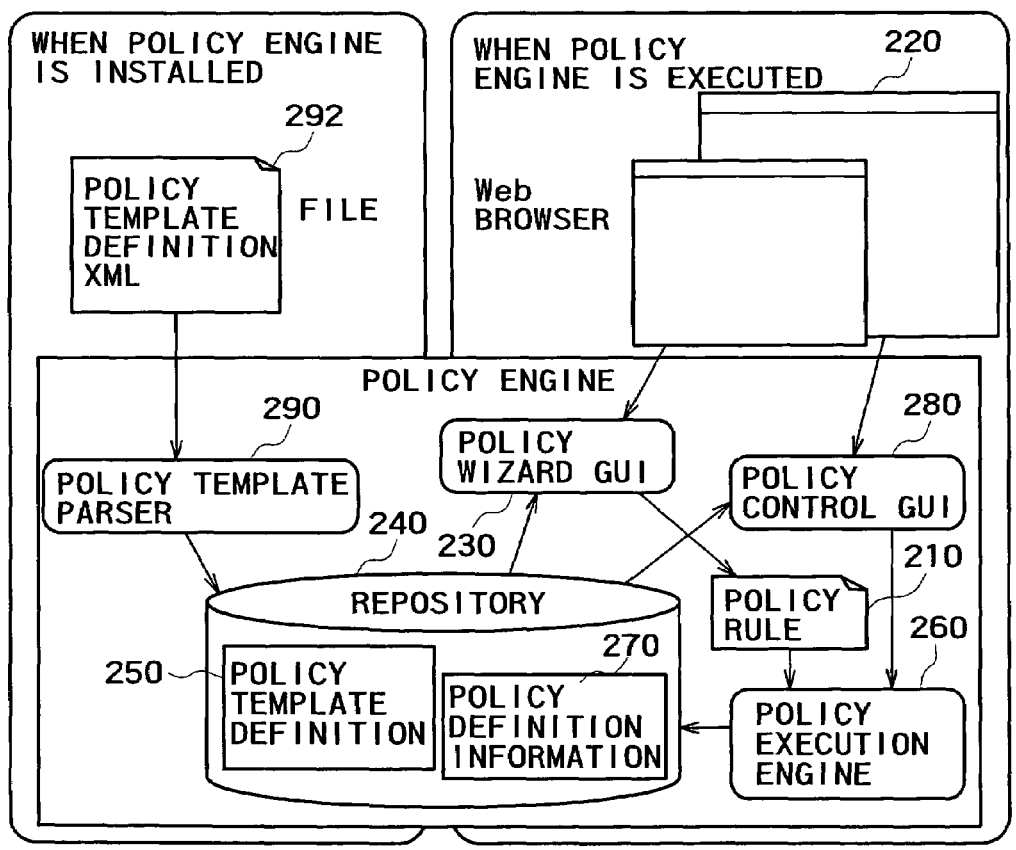
FIG. 2 illustrates the configuration and scheme of an information processing system according to one embodiment of the present invention.

FIG. 2 illustrates the configuration and scheme of the job management system. The job management system provides a user interface 220, which allows a user, operator, or other similar person to set a job definition statement (hereinafter referred to as a policy rule). The job management system stores a policy rule, which is set by the user interface, in the memory 112 of the computer 110 or in the external storage device 140 as a file in XML (Extensible Markup Language) format. An XML file in which a policy rule is written is hereinafter referred to as a policy definition XML file 210.

The above user interface 220 is implemented mainly by a function of a policy wizard GUI 230 shown in FIG. 2. In a repository 240, which is a database where various items of information about the job management system are registered and managed, a policy template definition 250, which includes the model data for a policy rule and the data stipulating the user interface 220, is registered.

In accordance with the policy template definition 250 registered in the repository 240, the policy wizard GUI 230 generates a Web page on which a series of setup guidance windows (wizard windows) organized to prompt the user to set up a job definition statement are written, as the above user interface 220, and then sequentially displays the generated setup guidance windows. The policy template definition 250 is the data that is used to execute the process for generating a job definition statement in accordance with the contents set by the user via the user interface 220. The policy wizard GUI 230 generates a policy rule by incorporating the contents, which are set by the user in accordance with the setup guidance windows, into the model data for a policy rule.

The policy rule generated by the policy wizard GUI 230 is interpreted by a policy execution engine 260 shown in FIG. 2 and then registered in the repository 240 as policy definition information/execution time information (schedule information) 270. The policy execution engine 260 exercises job execution control in accordance with the policy definition information/execution time information 270 registered in the repository 240.

A policy control GUI 280, which is shown in FIG. 2, is used by a user, operator, or other similar person as the GUI for managing the repository 240 and policy execution engine 260. The user, operator, or other similar person can use the policy control GUI 280, for instance, to reference, delete, validate, or invalidate a policy rule. The policy control GUI 280 enables the user, operator, or other similar person to exercise post-management over a previously set policy rule.

The above-mentioned policy template definition 250 is registered in the repository 240 by a policy template parser 290 shown in FIG. 2. A policy template definition XML file 292, which is shown in FIG. 2, is referenced when the policy template parser 290 registers the policy template definition 250 in the repository 240. In the policy template definition XML file 292, a stencil for a job definition statement and the data prescribing the user interface for job definition statement setup are written in XML format. The stencil can be used for a plurality of job definition statements and the data can be used for a plurality of policy template definitions in a modified embodiment.

The user, operator, or other similar person delivers an edited policy template definition XML file 292 to the policy template parser 290 when executing the policy template parser 290. This delivery is made, for instance, by specifying the name of the policy template definition XML file 292 as an argument for the command for executing the policy template parser 290. In accordance with the contents of the delivered policy template definition XML file 292, the policy template parser 290 generates a policy template definition 250 and registers it in the repository 240.

As described above, the policy template definition 250 can be generated and registered in the repository 240 with high efficiency by editing the policy template definition XML file 292. Further, the efficiency with which the policy template definition 250 is generated can be enhanced because the policy template definition XML file 292, which contains a stencil for a job definition statement appropriate for the policy rule to be generated and the data prescribing the user interface for job definition statement setup, is available from the beginning. Therefore, the information processing system administrator or other similar person can efficiently generate a user interface (e.g., a wizard window or other setup guidance window) that permits the user, operator, or other similar person to generate a job definition statement.

When the above stencils are used for editing the policy template definition XML file 292 as described above, the workload on the job management system administrator or other similar person can be reduced so that the policy template definition 250 can be generated with high efficiency. This advantage also makes it possible to offer various types of user interfaces in a manner flexible enough to match the information processing system configuration, elements, user needs, applicable operations, and other conditions, thereby reducing the workload on users, operators, and other job definition statement setup persons.

Policy Rule

As described above, the policy rule is managed as a policy definition XML file 210, which is in XML format. When the policy rule is managed as an XML-formatted file in a manner described above, it is possible, for instance, to easily exchange the policy rule with a remote information processing system. As a result, existing assets possessed by a remote information processing system can be effectively used while supplying assets to such a remote information processing system.

Further, when XML is used as a descriptive syntax for writing the policy rule, it is possible to (1) easily grasp the relationship to a window by noting the name of a tag, (2) assign a unique name to the contents of information, (3) freely determine the correlation between a tag and element, and make use of the other features proper to XML. In addition, future expandability can be provided by incorporating newly defined XML specifications.

The descriptive syntax for the policy definition XML file 210 basically conforms to that of XML. The job management system of the present embodiment, however, is capable of not only complying with the basic descriptive syntax of XML but also interpreting various elements and executing a corresponding process. Major elements unique to the information processing system are shown in FIG. 3. In this figure, the policy is a root element for the policy definition XML file 210. The policy group is an element for grouping a policy group and a root policy rule described later. The root policy rule is an element for grouping a policy condition and a policy action, which are described later, as well as the above policy rule.

The policy wait event condition is an element that is written when an event is to be awaited. This element is used for writing an event-driven policy. The policy schedule condition is an element that is written when a specified time is to be awaited. This element is written for executing a policy command action, which is described later, at a predetermined time. The policy command result condition is an element that is written when the end of a policy command action is to be awaited. If the policy command action execution result is a specified value, the policy command action serving as a sibling element will be executed.

The policy rule validity period is an element that is written to define the validity period of a root policy rule. The compound policy action is an element for grouping policy actions. The policy command action is a command that is executed when a policy wait event condition, policy schedule condition, policy command result condition, or other condition defined as a sibling element is established.

In the policy definition XML file 210, a global environment variable can be defined. The global environment variable can be commonly referenced by all policy command actions that are written as lower-level elements for a certain root policy rule. In an information processing system containing a plurality of computers, the computer executing a policy command action is not always the same. The global environment variable is useful if the variable to be commonly referenced by all policy command actions is to be provided in situations where a job targeted for a plurality of computers is set. Each policy command action can set an initial value for the global environment variable. The initial value for the global environment variable can also be set for a policy group and a root policy rule.

In the policy definition XML file 210, the elements described above are written in compliance with the XML syntax. In other words, the policy wizard GUI generates the policy definition XML file 210 by incorporating the contents, which are set by the user, operator, or other similar person in relation to the user interface 220, into the model data for the above policy rule contained in the policy template definition in accordance with the policy template definition registered in the repository 240. FIGS. 4A and 4B show a typical DTD (Document Type Definition) section as an example of the generated policy definition XML file 210.

Policy Template Definition

As described above, the policy template definition 250 is a description of the model data for a policy rule and the data prescribing the above user interface 220. The policy template definition 250 contains the above setup guidance windows, which the policy wizard GUI 230 displays for policy rule setup, as well as the information serving as a model for the policy definition XML file 210 that is to be generated.

FIG. 5 illustrates the structure of a policy template definition 250. FIG. 6 shows major elements of the policy template definition 250. In FIG. 5 and FIG. 6, the policy template set is a root element for all elements. The policy template group is an element for grouping policy templates. The policy template group can be written in a nested form. The policy template group plays a role similar to that of the file system's folder (directory). The policy template is an element for formulating various definitions for generating a policy rule.

The policy stencil is an element that defines the model of a policy rule (policy definition XML file). A statement can be written on the policy stencil. For example, it is possible to write a statement for exercising control so that the description between the start statement and end statement will be written into the policy definition XML file 210 as a valid description if the expression is true and will not be written if the expression is false. An example of such a statement is shown in FIG. 7 (the statement in this figure is a command named "@Validf"). It is also possible, for instance, to sequentially substitute list elements into a variable and write a statement for exercising control so as to repeatedly write the description between the start and end statements concerning each element into the policy definition XML file 210. An example of such a statement is shown in FIG. 8 (the statement in this figure is a command named "@ForEach").

The wizard page is an element for defining a setup guidance window (wizard window). Each wizard page corresponds to one page of a wizard window (a single Web page). On the wizard page, it is possible to write control data for specifying whether or not to display user-definable options in the wizard window. It is also possible to write control data for specifying whether or not to display a setup guidance window that can open subsequently to a preceding setup guidance window depending on a user response to the preceding setup guidance window.

For one wizard page, one or more parameter setup controls can be defined. Each parameter setup control is an element for finalizing a policy template variable (value substitution). One parameter setup control finalizes one policy template variable. Three different parameter setup controls are available: Text Line, Text Area, and Select Item. The Text Line control is used for specifying one character string line. The Text Area control is used for specifying a plurality of character string lines. The Select Item control is used for displaying a plurality of items and selecting a specific item from them. The policy template variable is a variable that is declared for a policy template. The method for finalizing its value is defined by a parameter setup control within a wizard page, and the value is referenced within a policy stencil or wizard page. The resource type is an element for defining which resource can be associated with a policy template.

Policy Template Definition XML File, etc.

As described above, the policy template definition XML file 292 is a file in which the data for generating a policy template definition 250 is written in XML format. The policy template definition XML file 292 contains an XML statement, which is in the form of a policy stencil to serve as a stencil for the above policy definition XML file 210. The data prescribing the above wizard page within the above policy template definition 250 is written in XML format together with the stencil for a job definition statement. FIGS. 9A and 9B show a typical DTD section as an example of the policy template definition XML file 292.

The policy template parser 290 interprets an entered policy template definition XML file 292 in order to register a policy template definition 250 conforming to the policy template definition XML file 292 in the repository 240. For example, the policy template parser 290 is implemented within the information processing system as a Java (registered trademark) class. Further, the policy template parser 290 offers a CLI (Command Line Interface) function as needed so that it can be started up from the command line.

The import function of the policy template parser 290 will now be described. The policy template parser 290 exercises its import function for the purpose of registering a policy template definition 250 in the repository 240 in accordance with the policy template definition XML file 292. When, for instance, the input interface 130 issues an instruction for executing the import function, the policy template parser 290 reads and interprets the policy template definition XML file 292. When there is no problem with the result of interpretation, the policy template parser 290 registers in the repository 240 a policy template definition 250 that is generated in accordance with the policy template definition XML file 292.

FIG. 10 is a PAD (Problem Analysis Diagram) illustrating a process that the policy template parser 290 performs in relation to the import function. When an instruction for executing the import function, the policy template parser 290 first clears a variable, sets an initial value, and performs other initial processing operations (step S1011). The policy template parser 290 also analyzes an argument that is incidentally specified for the instruction for import function execution (step S1012). Next, the policy template parser 290 views the contents of the repository 240 (step S1013) to check for a problem such as an inconsistency between the contents of the repository 240 and argument (step S1014). If any problem is found, the policy template parser 290 aborts the current process and then performs exception handling (step S1015). If no problem is found, on the other hand, the policy template parser 290 analyzes the contents of the policy template definition XML file 292 corresponding to the file name specified as an argument, and registers in the repository 240 a policy template definition 250 that corresponds to the policy template definition XML file 292 (step S1016). The process concerning the import function is then completed (step S1017).

The policy template parser 290 for the job management system of the present embodiment has various other functions in addition to the above import function, including an export function for generating a policy template definition XML file 292 in accordance with a policy template definition 250 registered in the repository 240 and a function for deleting a policy template definition 250 registered in the repository 240.

Policy Rule Setup

Figure 11:
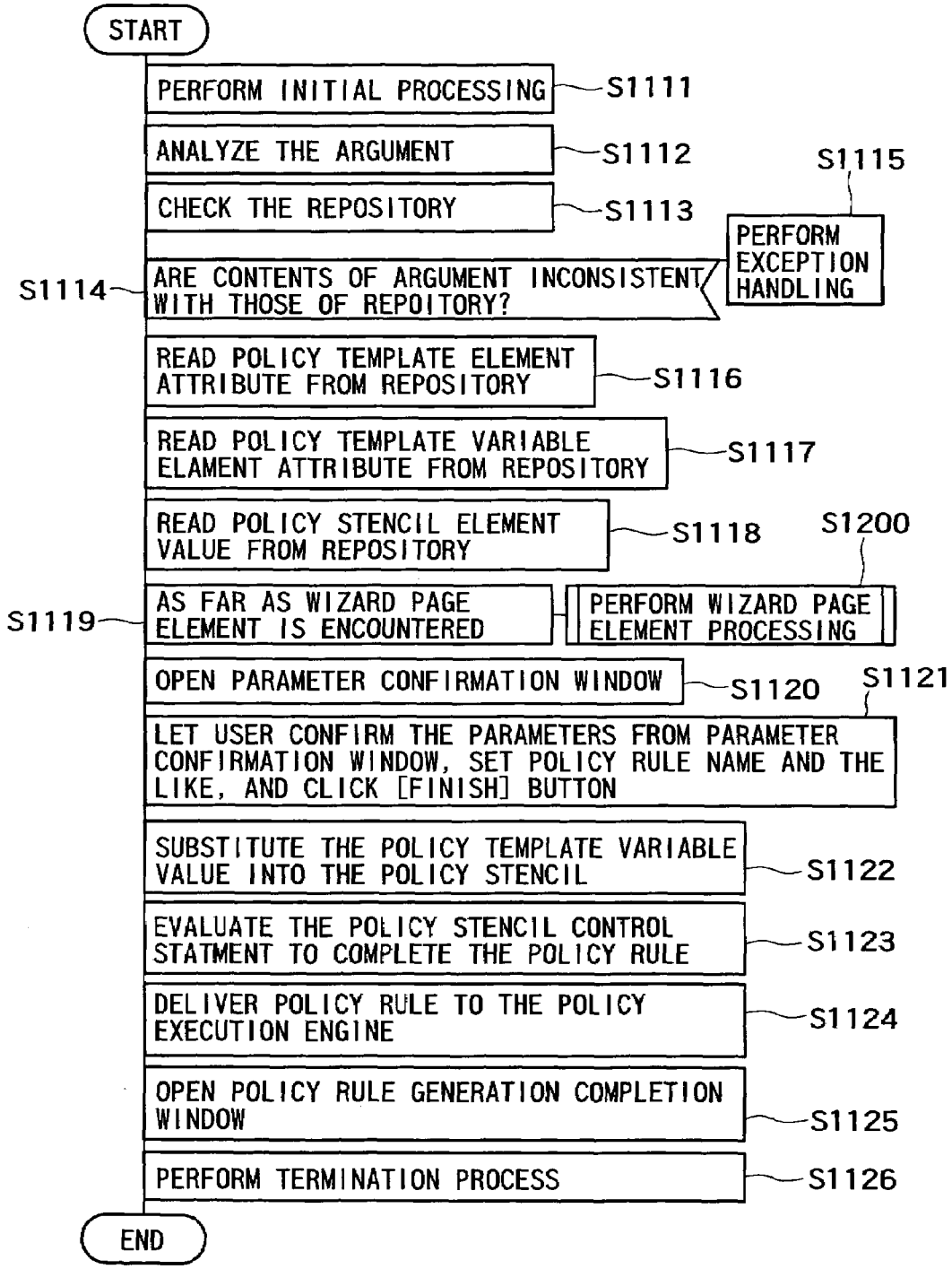
FIG. 11 is a PAD illustrating a process that a policy wizard GUI according to one embodiment of the present invention performs to generate a policy rule.

The user, operator, or other similar person creates a policy rule in accordance with setup guidance windows displayed by the policy wizard GUI 230. FIG. 11 is a PAD illustrating a process that the policy wizard GUI 230 performs to generate a policy rule. The policy wizard GUI 230 first clears a variable, sets an initial value, and performs other initial processing operations (S1111), then analyzes an argument that is incidentally specified for the instruction for import function execution (S1112). Next, the policy wizard GUI 230 views the repository 240 (S1113) to check for a problem such as an inconsistency between the contents of the repository 240 and argument (S1114). If any problem is found, the policy wizard GUI 230 aborts the current process and then performs exception handling (S1115). Next, the policy wizard GUI 230 reads a policy template element attribute, policy template variable element attribute, and policy stencil element value from the repository 240 (S1116–S1118). Subsequently, the policy wizard GUI 230 initiates a process for all wizard page elements contained in the policy template definition 250 (S1119).

Figure 12:
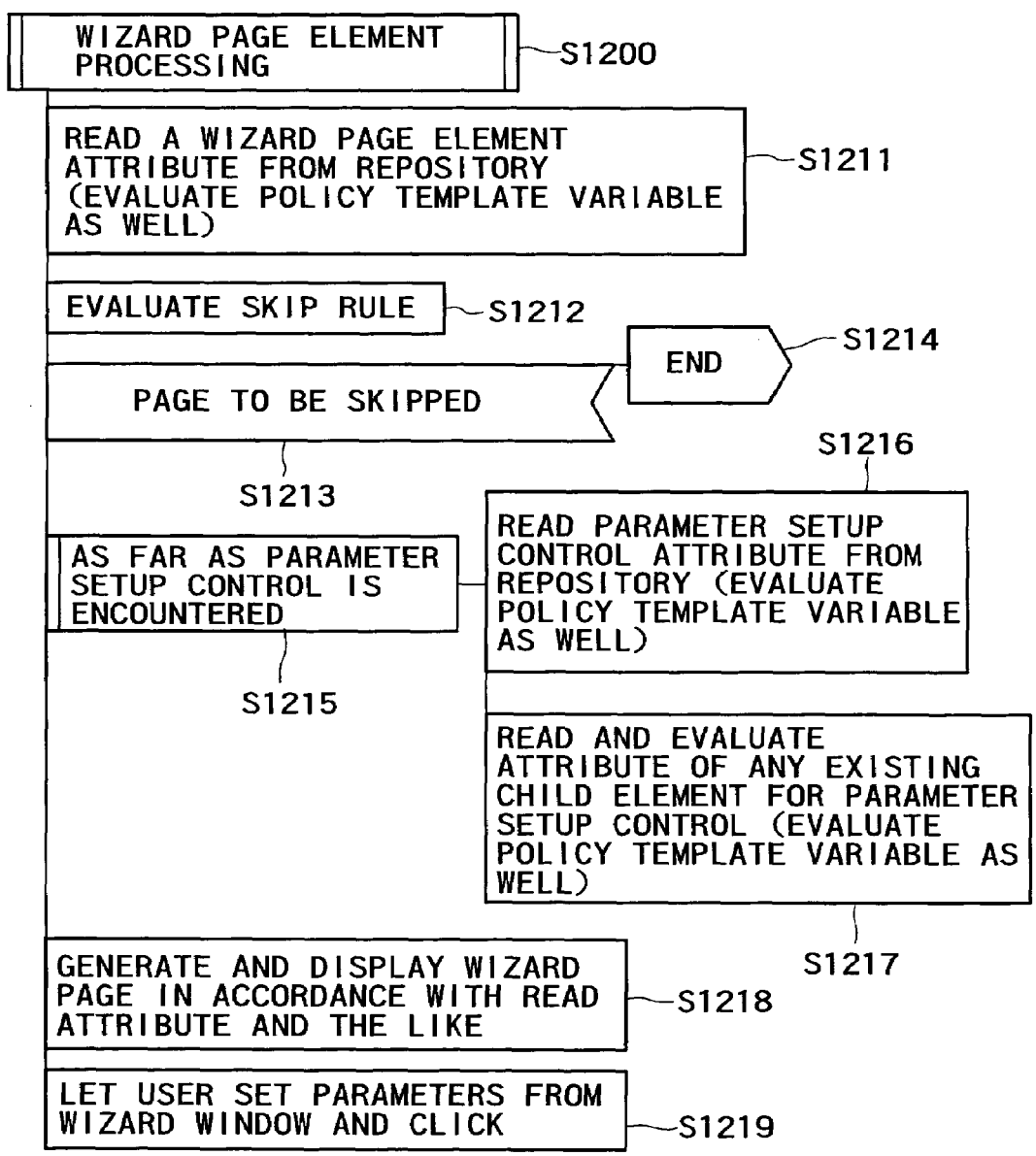
FIG. 12 is a PAD that illustrates a process concerning wizard page elements according to one embodiment of the present invention.

FIG. 12 is a PAD that illustrates a process concerning wizard page elements. The policy wizard GUI 230 first reads the attribute of a wizard element from the repository 240 (S1211). In this instance, the policy wizard GUI 230 also evaluates the policy template variable. Next, the policy wizard GUI 230 checks whether the page should be skipped (skip rule evaluation in the figure) (S1212). If the page should be skipped (S1213), the policy wizard GUI 230 terminates the wizard page element process (S1214). If there is the next wizard page element to be processed, the policy wizard GUI 230 starts the process for it. If there is no more wizard element to be processed, the policy wizard GUI 230 proceeds to perform processing step S1215.

In processing step S1215, the policy wizard GUI 230 starts a process for the parameter setup controls contained in an element of the wizard page. The policy wizard GUI 230 first reads the attribute of a parameter setup control from the repository 240. In this case, the policy wizard GUI 230 also evaluates the policy template variable. The parameter setup control mentioned here is "TextLine," "TextArea," or "SelectItem." If there is a child element for the parameter setup control, the policy wizard GUI 230 reads and evaluates its attribute. In this instance, the policy wizard GUI 230 also evaluates the policy template variable (S1217).

In the next processing step (S1218), a setup guidance window (wizard window) appears on the display device 120 in accordance with the read attribute and other data. The user performs setup in relation to this setup guidance window. Upon completion of setup, the user clicks the Next button or performs some other operating step to switch to the next window (S1219). Although the description of the present embodiment assumes a relatively simple user operation, the contents of the setup guidance windows to be displayed and their display method are not limited to those described herein.

When all the wizard page elements are completely processed (S1200) as a result of processing depicted in FIG. 11 (S1119), the policy wizard GUI 230 opens a parameter confirmation window (S1120). The user, operator, or other similar person confirms the parameters, sets a policy rule, and performs other setup operations from the parameter confirmation window, which is opened by a setup guidance window, and clicks the Finish button if there is no problem (S1121). Next, the policy wizard GUI 230 substitutes the value of the policy template variable into the policy stencil (S1122). Further, the policy wizard GUI 230 evaluates a policy stencil control statement to complete the policy rule (S1123).

The completed policy rule is output as a policy definition XML file 210 and delivered to the policy execution engine 260 (S1124). This delivery is made by the functionality of a policy parser, which is not shown. The policy parser interprets the completed policy definition XML file 210 to generate a policy rule instance and then registers it in the policy execution engine 260. Upon completion of the above process, the policy wizard GUI 230 opens a policy rule generation completion window (S1125) and terminates a policy rule (policy definition XML file) generation process (S1126).

If a plurality of policy template definitions 250 are registered in the repository 240, the process illustrated in FIG. 11 is performed for each policy template definition 250. In situations where a plurality of policy template definitions 250 are registered in the repository 240, setup guidance windows appropriate for individual policy template definitions 250 are offered.

Preferable Application

Figure 13:
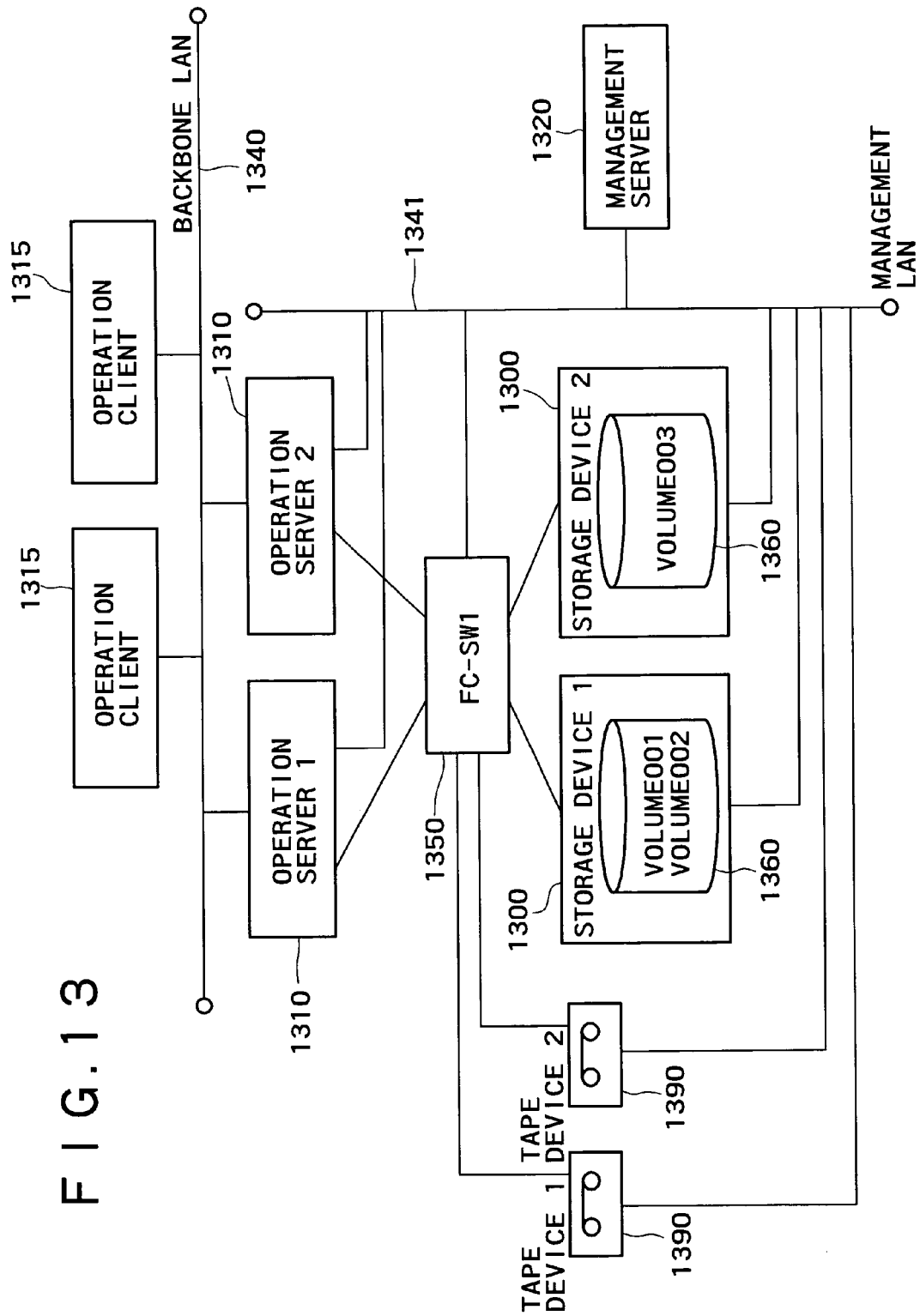
FIG. 13 shows a concrete example of an information processing system to which a job management system is applied in accordance with one embodiment of the present invention.

A preferable application of an information processing system in which the above job management system operates will now be described. The FIG. 13 illustrates an information processing system that functions as a typical storage system, which is operated, for instance, at a corporation's system center or a privately/publicly managed data center. In this storage system, a program for implementing the job management system runs on a management server 1320. The management server 1320 is a computer for servicing, operating, managing, or otherwise handling the storage system. The management server 1320 is used, for instance, to perform setup for making a storage device 1300 available to an operation server 1310, set up a SAN, set the operation server 1310 to execute a batch process, and perform a process for allowing a tape device 1390 to store a data backup that is stored in the storage device 1300.

When a job to be performed by various devices within the information processing system in relation to the job management system running on the management server 1320 is defined as a policy rule by the operator or other similar person, the management server 1320 executes a command for controlling the various devices so that the various devices perform processes in compliance with the policy rule. If, for instance, the operator or other similar person sets a policy rule for making a backup at a preselected time, the management server 1320 executes a command for controlling a logical volume 1360, which will be described later, as well as the tape device 1390 so as to ensure that a process will be performed in compliance with the policy rule.

The management server (information processing device) 1320 is connected to the operation server 1310, FC-SW1 1350, the storage device 1300, and the tape device 1390 via a management LAN 1341.

FIG. 14 illustrates the configuration of the management server 1320. The management server 1320 comprises a CPU 1410, a memory 1411, a LAN interface 1412, a recording media reader 1420, an input device 1425, an output device 1426, and a storage device 1430. The recording media reader 1420 is a device for reading a program or data that is recorded on a recording medium 1421. For example, a program 1450 for implementing the above job management system, which is recorded on the recording medium 1421, can read from the recording medium 1421 by the recording media reader 1420 and stored in the memory 1411 or the storage device 1430. As the recording medium 1421, a flexible disk, CD-ROM, DVD-ROM, semiconductor memory, or other similar medium can be used.

As the storage device 1430, a hard disk drive, flexible disk drive, semiconductor memory, or other similar device can be used. The input device 1425 is used, for instance, when the user, operator, or other similar person enters data into the management server 1320. As the input device 1425, a keyboard, mouse, or other similar device can be used. As the output device 1426, a display, printer, or other similar device can be used. The LAN interface 1412 is a device for communicating with the operation server 1310, FC-SW1 1350, the storage device 1300, or the tape device 1390.

An operation client 1315 is connected to the operation server 1310 via a backbone LAN (Local Area Network) 1340. The operation server 1310 and the operation client 1315 are both computers that are equipped, for instance, with a CPU (Central Processing Unit), a memory, and an input/output device. Therefore, the operation client 1315 can receive various services that are offered by the operation server 1310.

The services offered by the operation server 1310 include, for instance, on-line services such as a bank's automated teller service and Internet homepage browsing service, and a batch processing service for technological experiment simulations.

The operation server 1310 is connected to the storage device 1300 and the tape device (backup device) 1390 via FC-SW1 (Fibre Channel Switch 1, network device) 1350. FC-SW1 1350 is a switch for establishing a SAN (Storage Area Network) connection among the operation server 1310, the storage device 1300, and the tape device 1390.

The storage device 1300 supplies a storage resource as needed when the operation server 1310 offers an information processing service to the operation client 1315. For example, a disk array device can be used as the storage device 1300. The storage resource is supplied as a logical volume 1360. The logical volume 1360 is a storage area that is logically set within a physical storage region, which is provided by a disk drive incorporated in the storage device 1300. As the disk drive, a hard disk drive, flexible disk drive, semiconductor memory, or other similar device can be used. The disk drive may be managed as a RAID (Redundant Array of Inexpensive Disks).

The present invention has been described with reference to a preferred embodiment. The present embodiment is considered in all respects to be illustrative, and not restrictive. Therefore, the present invention is not limited to a particular embodiment, but extends to various modifications that nevertheless fall within the scope of the appended claims or the equivalence thereof.

What is claimed is:

1. A computer-implemented job management method for an information processing system that includes a plurality of information processing devices that execute a policy command action concerning a same job, the job management method comprising:

storing in a computer-readable storage medium a stencil for a job definition statement and UI (user interface) data prescribing a user interface for job definition statement setup, wherein the UI data is used to produce a user interface for generating the job definition statement;

generating data for executing a process for generating the job definition statement based on contents set by a user via the user interface in accordance with the stencil and the UI data stored in the computer-readable storage medium; and generating the job definition statement by executing the process in accordance with the generated data;

wherein the stencil contains, in accordance with a user selection made via the user interface, a definition statement for invalidating a specific description written in the stencil, and the stencil defines a global environment variable commonly referenced by all policy command actions that are written as lower-level elements for a root policy rule, wherein each policy command action is capable of setting an initial value for the global environment variable, wherein the stencil is written in XML format, wherein the information processing system interprets elements in the job definition statement and executes a corresponding process for each element, the elements including:

a root element in the job definition statement, referred to as a policy;

an element for grouping policy conditions and policy actions, referred to as policy rules;

an element for grouping a plurality of the policy rules, referred to as a policy group;

an element that waits for an event, referred to as a policy wait event condition;

an element that waits for a specified amount of time, referred to as a policy schedule condition;

an element that waits for a specified policy command action to terminate, referred to as a policy command result condition; and an element that defines a validity period of a root policy rule, referred to as a policy rule validity period.

2. The computer-implemented job management method according to claim 1, wherein the UI data is positioned in a file in which the stencil is written.

3. The computer-implemented job management method according to claim 1, wherein the user interface is capable of opening a window, which is organized to prompt a user for setup, in order to prompt the user to set the job definition statement.

4. The computer-implemented job management method according to claim 3, wherein the UI data contains control data for specifying whether the window should display user-definable options.

5. The computer-implemented job management method according to claim 3, wherein the UI data contains control data for specifying whether or not to display a window that can open subsequently to a preceding window depending on a user response to the preceding window.

6. The computer-implemented job management method according to claim 1, wherein the stencil contains, in accordance with a user selection made via the user interface, a definition statement issuing an instruction for generating a job definition statement in which a specific description written in the stencil is repeatedly written.

7. The computer-implemented job management method according to claim 1, wherein the job definition statement contains a definition statement for setting a job network that executes a stream of a plurality of jobs.

8. An information processing system including a plurality of information devices that execute a policy command action concerning a same job, the information processing system comprising:

means for storing in a computer-readable storage medium a stencil for a job definition statement and UI data prescribing a user interface for job definition statement setup, wherein the UI data is used to produce a user interface for generating the job definition statement;

means for generating data for executing a process for generating the job definition statement based on contents set by a user via the user interface in accordance with the stencil data stored in the computer-readable storage medium; and means for generating the job definition statement by executing the process in accordance with the generated data;

wherein the stencil contains, in accordance with a user selection made via the user interface, a definition statement for invalidating a specific description written in the stencil, and the stencil defines a global environment variable commonly referenced by all policy command actions that are written as lower-level elements for a root policy rule, wherein each policy command action is capable of setting an initial value for the global environment variable, wherein the stencil is written in XML format, wherein the information processing system interprets elements in the job definition statement and executes a corresponding process for each element, the elements including:

a root element in the job definition statement, referred to as a policy;

an element for grouping policy conditions and policy actions, referred to as policy rules;

an element for grouping a plurality of the policy rules, referred to as a policy group;

an element that waits for an event, referred to as a policy wait event condition;

an element that waits for a specified amount of time, referred to as a policy schedule condition;

an element that waits for a specified policy command action to terminate, referred to as a policy command result condition; and an element that defines a validity period of a root policy rule, referred to as a policy rule validity period.

9. The information processing system according to claim 8, further comprising means for importing or exporting the stencil as data in file form.

10. The information processing system according to claim 8, wherein the stencil contains, in accordance with a user selection made via the user interface, a definition statement issuing an instruction for generating a job definition statement in which a specific description written in the stencil is repeatedly written.

11. A computer readable storage product having a program for execution by an information processing system including a plurality of information devices that execute a policy command action concerning a same job, the program comprising:

code for storing in a computer-readable storage medium a stencil for a job definition statement and UI data prescribing a user interface for job definition statement setup, wherein the UI data is used to produce a user interface for generating the job definition statement;

code for generating data for executing a process for generating the job definition statement based on contents set by a user via the user interface in accordance with the stencil and the UI data stored in the computer-readable storage medium; and code for generating the job definition statement by executing the process in accordance with the generated data;

wherein the stencil for the job definition statement contains, in accordance with a user selection made via the user interface, a definition statement for invalidating a specific description written in the stencil, and the stencil defines a global environment variable commonly referenced by all policy command actions that are written as lower-level elements for a root policy rule, wherein each policy command action is capable of setting an initial value for the global environment variable, wherein the stencil is written in XML format.

wherein the information processing system interprets elements in the job definition statement and executes a corresponding process for each element, the elements including:

a root element in the job definition statement, referred to as a policy;

an element for grouping policy conditions and policy actions, referred to as policy rules;

an element for grouping a plurality of the policy rules, referred to as a policy group;

an element that waits for an event, referred to as a policy wait event condition;

an element that waits for a specified amount of time, referred to as a policy schedule condition;

an element that waits for a specified policy command action to terminate, referred to as a policy command result condition; and an element that defines a validity period of a root policy rule, referred to as a policy rule validity period.

12. The computer readable storage product according to claim 11, wherein the stencil contains, in accordance with a user selection made via the user interface, a definition statement issuing an instruction for generating a job definition statement in which a specific description written in the stencil is repeatedly written.

13. A computer readable storage product having a program for enabling an information processing system including a plurality of information devices that execute a policy command action concerning a same job, the program comprising:

code for generating data for executing a process for generating a job definition statement based on contents set by a user via a user interface in accordance with a stencil for the job definition statement and UI data prescribing the user interface for job definition statement setup, the stencil and the UI data having been previously stored in a computer-readable storage medium, wherein the UI data is used to produce a user interface for generating the job definition statement;

wherein the stencil contains, in accordance with a user selection made via the user interface, a definition statement for invalidating a specific description written in the stencil, and the stencil defines a global environment variable commonly referenced by all policy command actions that are written as lower-level elements for a root policy rule, wherein each policy command action is capable of setting an initial value for the global environment variable, wherein the stencil is written in XML format, wherein the information processing system interprets elements in the job definition statement and executes a corresponding process for each element, the elements including:

a root element in the job definition statement, referred to as a policy;

an element for grouping policy conditions and policy actions, referred to as policy rules;

an element for grouping a plurality of the policy rules, referred to as a policy group;

an element that waits for an event, referred to as a policy wait event condition;

an element that waits for a specified amount of time, referred to as a policy schedule condition;

an element that waits for a specified policy command action to terminate, referred to as a policy command result condition; and an element that defines a validity period of a root policy rule, referred to as a policy rule validity period.

14. A computer readable storage product having a program for enabling an information processing device in an information processing system including a plurality of information devices that execute a policy command action concerning a same job; which comprises means for storing in a computer-readable storage medium a stencil for a job definition statement and UI data prescribing a user interface for job definition statement setup, wherein the UI data is used to produce a user interface for generating the job definition statement; and means for generating data for executing a process for generating the job definition statement based on the contents set by a user via the user interface in accordance with the stencil and the UI data stored in the computer-readable storage medium; to implement the user interface in accordance with the generated data and exercise a function for generating the job definition statement;

wherein the stencil contains, in accordance with a user selection made via the user interface, a definition statement for invalidating a specific description written in the stencil, and the stencil defines a global environment variable commonly referenced by all policy command actions that are written as lower-level elements for a root policy rule, wherein each policy command action is capable of setting an initial value for the global environment variable, wherein the stencil is written in XML format, wherein the information processing system interprets elements in the job definition statement and executes a corresponding process for each element, the elements including:

a root element in the job definition statement, referred to as a policy;

an element for grouping policy conditions and policy actions, referred to as policy rules;

an element for grouping a plurality of the policy rules, referred to as a policy group;

an element that waits for an event, referred to as a policy wait event condition;

an element that waits for a specified amount of time, referred to as a policy schedule condition;

an element that waits for a specified policy command action to terminate, referred to as a policy command result condition; and an element that defines a validity period of a root policy rule, referred to as a policy rule validity period.

15. A storage system which includes a storage device for storing data for use in an operation server and a management server for managing the operation of the storage device, defining a job targeted for execution as a policy rule, and executing a process in compliance with the policy rule, the job executed by a policy command action performed by a plurality of information devices, the storage system comprising:

a storage section configured to store information about first data concerning the policy rule and second data prescribing a user interface for setting the policy rule, the first data defining a global environment variable commonly referenced by all policy command actions that are written as lower-level elements for a root policy rule, wherein each policy command action is capable of setting an initial value for the global environment variable; and a policy wizard GUI which is configured to
  read element attribute information about the policy rule from the storage section, process an element of a wizard page defining a guidance window, for policy setup, and generate a wizard window using the second data stored in the storage section;
  enter policy rule setup information via the user interface in compliance with an instruction displayed by the generated window; and
  generate the policy rule in accordance with the information entered via the user interface;
wherein the first data contains, in accordance with a user selection made via the user interface, a definition statement for invalidating a specific description written therein,
wherein the policy rule further includes elements, each of which is associated with a corresponding process to be executed, the elements including:
  a root element, referred to as a policy;
  an element for grouping policy conditions and policy actions, referred to as policy grouping rules;
  an element for grouping a plurality of the policy grouping rules, referred to as a policy group;
  an element that waits for an event, referred to as a policy wait event condition;
  an element that waits for a specified amount of time, referred to as a policy schedule condition;
  an element that waits for a specified policy command action to terminate, referred to as a policy command result condition; and
  an element that defines a validity period of a root policy rule, referred to as a policy rule validity period.

16. The storage system according to claim 15, wherein the policy rule set via the user interface is stored in XML format in the storage section.

17. The storage system according to claim 15, wherein a policy template defining data for executing a policy rule generation process in accordance with contents set by a user via the user interface contains information about a policy guidance window serving as the user interface and information about a generated policy definition XML file.

18. The storage system according to claim 15, wherein the policy rule generated by the policy wizard GUI is delivered to a policy execution engine and registered.

19. The storage system according to claim 15, wherein the storage section stores beforehand multiple instances of the first data and multiple instances of the second data.

* * * * *